US010633054B1

(12) United States Patent
Arnott et al.

(10) Patent No.: US 10,633,054 B1
(45) Date of Patent: *Apr. 28, 2020

(54) MOTORCYCLE DISPLAY UNIT SYSTEM AND METHOD

(71) Applicant: Arnott T&P Holding, LLC, Merritt Island, FL (US)

(72) Inventors: Adam Arnott, Windermere, FL (US); Matt Edward Kirar, Merritt Island, FL (US)

(73) Assignee: ARNOTT T&P HOLDING, LLC, Merritt Island, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,308

(22) Filed: Apr. 26, 2019

Related U.S. Application Data

(62) Division of application No. 16/039,759, filed on Jul. 19, 2018, now Pat. No. 10,300,981, which is a
(Continued)

(51) Int. Cl.
*B62J 6/00* (2020.01)
*B62K 25/28* (2006.01)
*B62J 99/00* (2020.01)
*B62J 1/00* (2006.01)
*B62K 25/04* (2006.01)

(52) U.S. Cl.
CPC ............. *B62K 25/283* (2013.01); *B62J 6/00* (2013.01); *B62J 1/00* (2013.01); *B62J 2099/0026* (2013.01); *B62J 2099/0033* (2013.01); *B62K 2025/045* (2013.01); *B62K 2201/08* (2013.01)

(58) Field of Classification Search
CPC .. B62J 6/00; B62J 2700/00; B62J 2099/0026; B62J 2099/0033; B62J 9/00; B62J 9/003; B62J 2300/0026
See application file for complete search history.

(56) References Cited

U.S. PATENT DOCUMENTS 3,346,272 A 10/1967 Smith
4,261,446 A 4/1981 Bolger
(Continued)

FOREIGN PATENT DOCUMENTS

CN 106183684 A 12/2016
EP 0080267 A1 6/1983
(Continued)

OTHER PUBLICATIONS

Extended European Search Report for Application No. 19154451.9-1013 filed Jan. 30, 2019, report dated Jul. 25, 2019, 8 pages.

*Primary Examiner* — James A English
(74) *Attorney, Agent, or Firm* — Brian S. Steinberger; Hilary F. Steinberger; Law Offices of Brian S. Steinberger, P.A.

(57) ABSTRACT

Devices, systems and methods for providing rider control assemblies for adjusting and displaying pressure and height settings for vehicle air suspension devices, such as on adjustable air shocks and air struts, used in vehicles such as motorcycles. The assemblies can have a protruding eyelet portion that can be mounted to existing control panel clamps on motorcycle handlebars. The assemblies can have two part housings attached to one another by waterproof gaskets placed in opposite facing channels.

13 Claims, 15 Drawing Sheets

Related U.S. Application Data division of application No. 15/291,963, filed on Oct. 12, 2016, now Pat. No. 10,189,535.

(56) References Cited

U.S. PATENT DOCUMENTS

| | | |
|---|---|---|
| 4,276,971 A | 7/1981 | Horvath |
| 4,567,637 A | 2/1986 | Pees et al. |
| 4,574,450 A | 3/1986 | Fannin et al. |
| 4,660,810 A | 4/1987 | Buma |
| 4,715,107 A | 12/1987 | Fresch et al. |
| 4,768,758 A | 9/1988 | Buma |
| 6,113,322 A | 9/2000 | Harmand et al. |
| 6,418,360 B1 | 7/2002 | Spivey et al. |
| 6,762,377 B2 | 7/2004 | Abrahamson |
| 8,113,322 B2 | 2/2012 | Arnott |
| 8,292,306 B1 | 10/2012 | Arnott |
| 9,329,917 B2 | 5/2016 | Arnott et al. |
| 9,434,437 B2 | 9/2016 | Van Dyke et al. |
| 9,566,841 B2 | 2/2017 | Legros et al. |
| 9,665,418 B2 | 5/2017 | Arnott et al. |
| 9,694,642 B2 | 7/2017 | Kantor et al. |
| 9,707,817 B1 | 7/2017 | Arnott et al. |
| 9,708,028 B1 | 7/2017 | Arnott et al. |
| 9,713,945 B1 | 7/2017 | Arnott et al. |
| 9,714,066 B1 | 7/2017 | Arnott et al. |
| 9,932,084 B2 | 4/2018 | Awasa |
| 10,189,535 B1 | 1/2019 | Arnott et al. |
| 10,300,981 B1 | 5/2019 | Arnott et al. |
| 2003/0193155 A1 | 10/2003 | Smith |
| 2004/0173045 A1 | 9/2004 | Hancock et al. |
| 2004/0220708 A1* | 11/2004 | Owen ................ B60G 17/0152 |
| | | 701/31.4 |
| 2005/0067203 A1 | 3/2005 | Uno |
| 2007/0283561 A1 | 12/2007 | Carlstedt et al. |
| 2008/0238073 A1 | 10/2008 | Brawn |
| 2009/0206530 A1 | 8/2009 | Arnott |
| 2012/0092823 A1 | 4/2012 | Wotton |
| 2014/0077465 A1* | 3/2014 | Murakami ............. B62K 25/06 |
| | | 280/6.157 |
| 2014/0252746 A1 | 9/2014 | Talavasek et al. |
| 2014/0375002 A1 | 12/2014 | Coombs |
| 2016/0052464 A1 | 2/2016 | Wadey et al. |
| 2017/0369119 A1* | 12/2017 | Ashdown ................ B62K 25/28 |
| 2018/0163811 A1 | 6/2018 | Lee |

FOREIGN PATENT DOCUMENTS

| | | |
|---|---|---|
| EP | 2711276 A1 | 3/2014 |
| EP | 2711276 A1 | 3/2014 |
| EP | 2990240 A1 | 3/2016 |
| FR | 3026059 A1 | 3/2016 |
| GB | 2332494 A | 6/1999 |
| JP | 2011144871 A | 7/2011 |
| KR | 20130101746 A | 9/2013 |
| KR | 101768022 | 8/2017 |
| WO | 2015084099 A1 | 6/2015 |

* cited by examiner

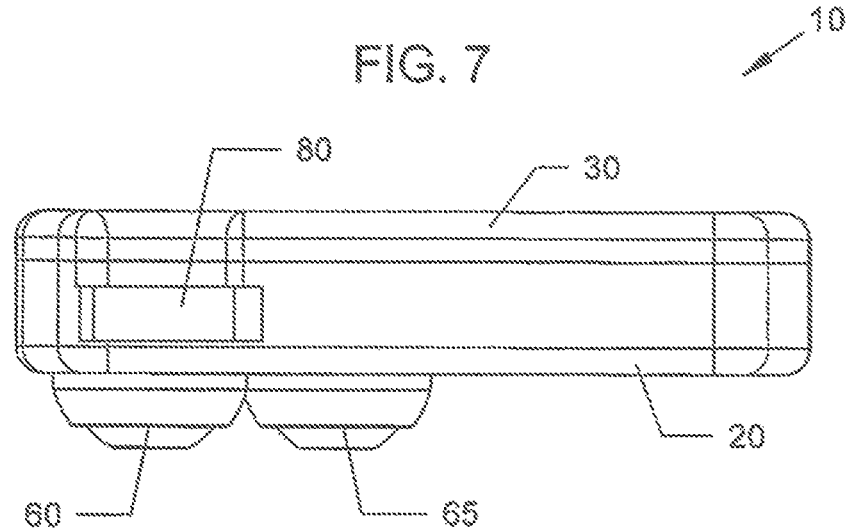
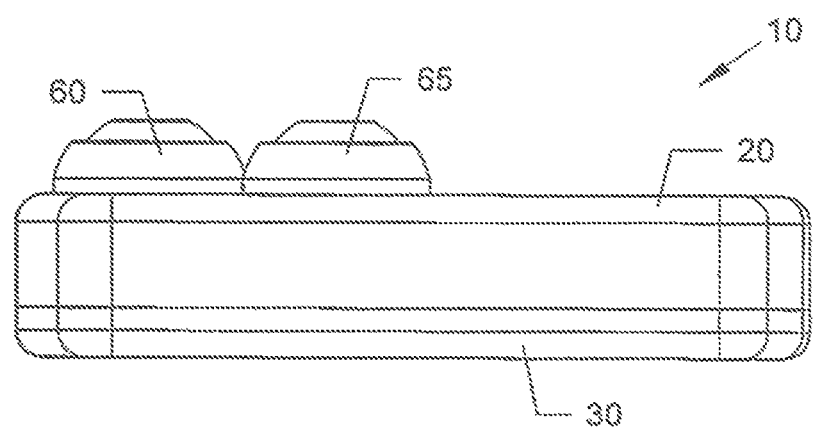

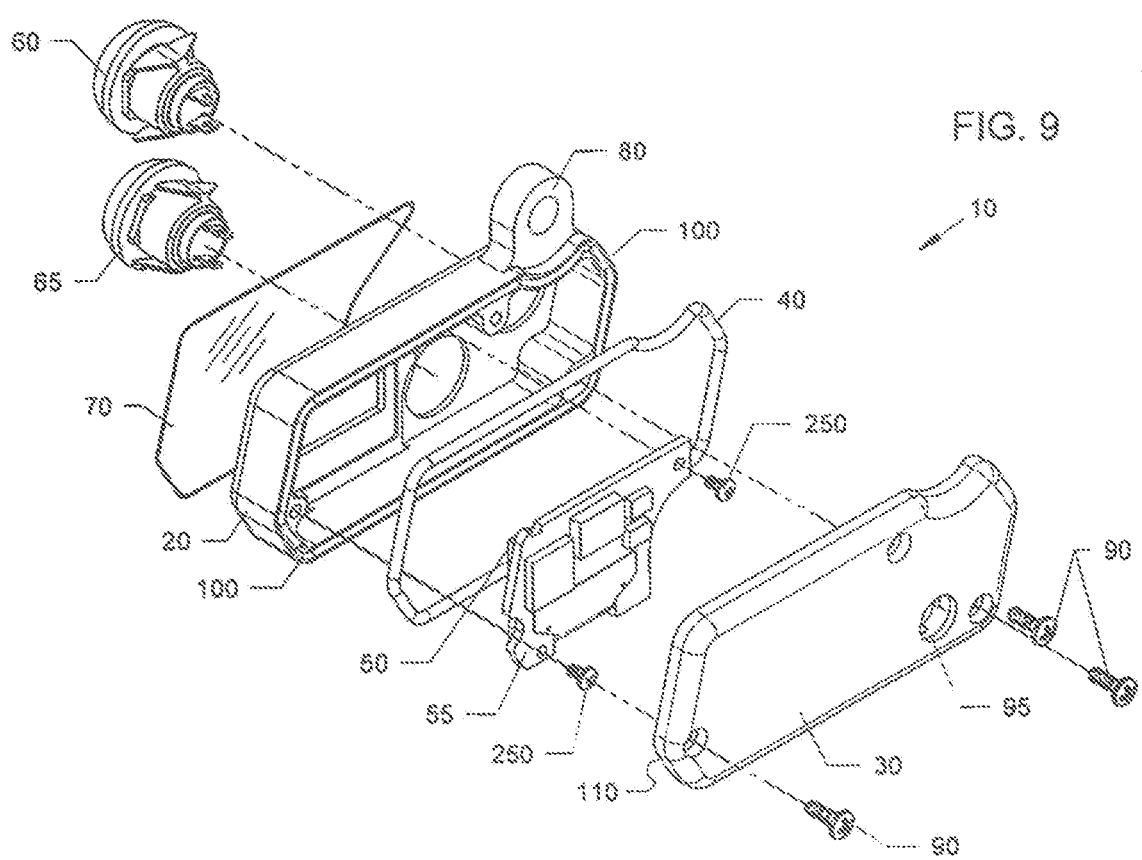

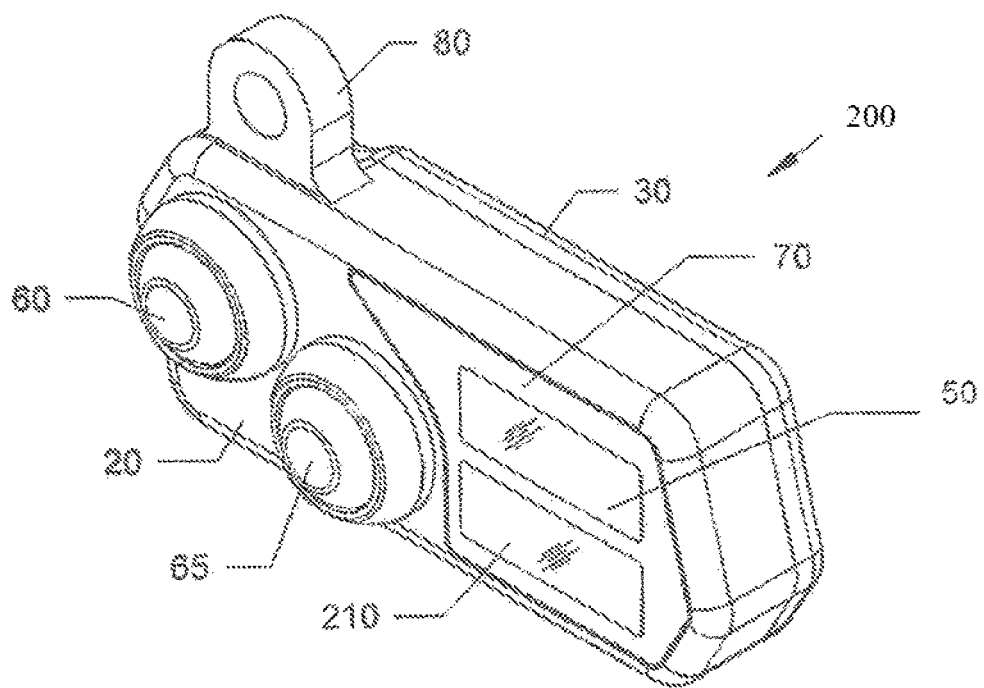
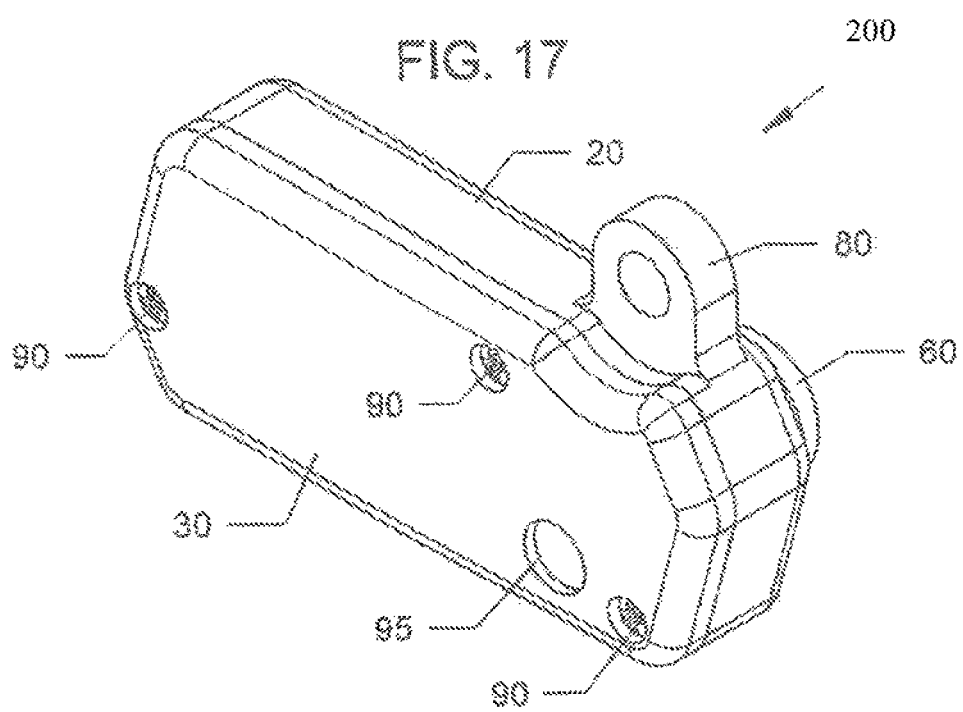

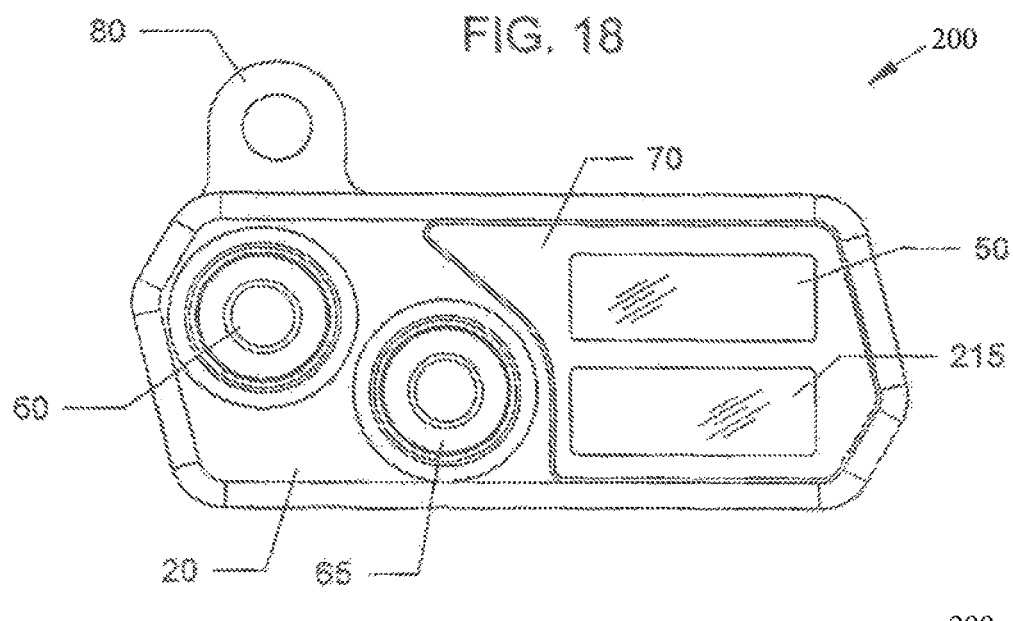
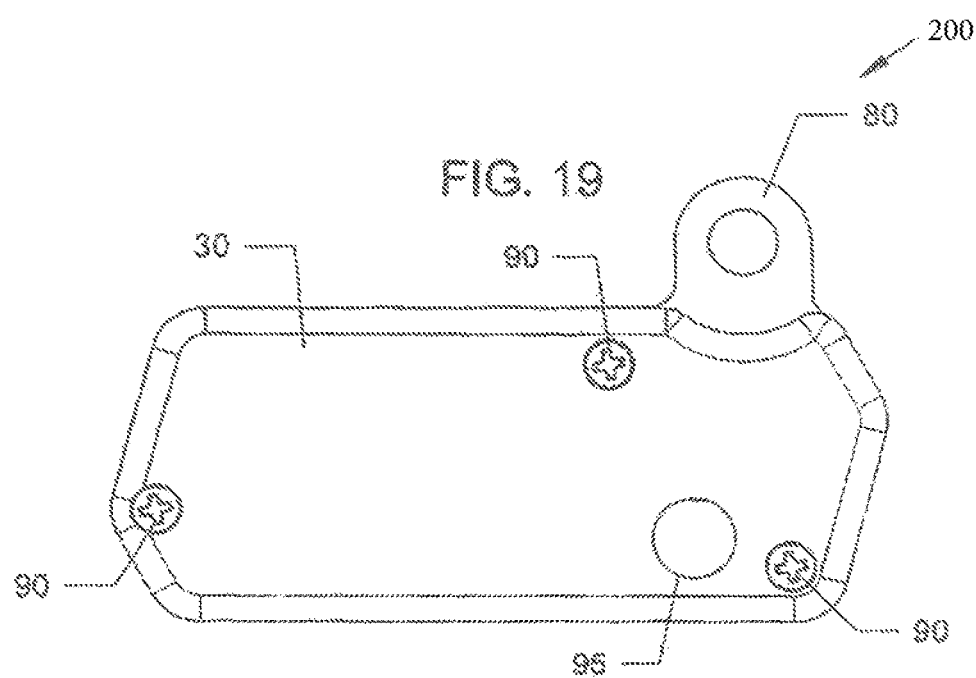

MOTORCYCLE DISPLAY UNIT SYSTEM AND METHOD

This application is a Divisional of U.S. patent application Ser. No. 16/039,759 filed Jul. 19, 2018, now U.S. Pat. No. 10,300,981, which is a Divisional of U.S. patent application Ser. No. 15/291,963 filed Oct. 12, 2016, now U.S. Pat. No. 10,189,535. The entire disclosure of each of the applications listed in this paragraph are incorporated herein by specific reference thereto.

FIELD OF INVENTION

This invention relates to air suspension controls, and in particular to devices, systems and methods for providing rider controls for adjusting and displaying pressure and height settings for vehicle air suspension devices used in vehicles such as motorcycles.

BACKGROUND AND PRIOR ART

Conventional, stock, and after-market suspension products such as air shocks and air springs are generally preset to a specific maximum weight accommodation level. This preset suspension does not always provide the best ride or handling for the riders. Additionally, motorcycles are known to have hard rides that are not comfortable for many riders such as the elderly, oveweight individuals, and women.

Tuning conventional spring and shocks on for motorcycles can be arduously tedious, taking days or even weeks. Thus, it is not practical to allow for real-time tuning of conventional springs and shocks.

Current springs used in motorcycles are usually progressive in that their lifespan and use deteriorate over time. For example, as the spring compresses, the spring weakens over time, making the ride less desirable for the riders.

Conventional air suspension systems often result in non-smooth and uncomfortable rides, coupled with undesirable vehicle ride performance.

Motorcycles That Have Some Type of Air Suspension System

U.S. Pat. No. 8,113,322 to Arnott, which is assigned to the same assignee as the subject application, and is incorporated by reference in its' entirety, describes and shows a motorcycle air suspension system and method, that allows a rider to adjust and display basic air pressure used in air suspension devices on motorcycles. However, this system has some limitations.

For example, motorcycles are often ridden during inclement weather conditions, where devices must be protected from such conditions.

In addition, none of the pressure settings allow for the rider to determine the height of their seat above ground level.

Thus, the need exists for solutions to the above problems with the prior art.

SUMMARY OF THE INVENTION

A primary objective of the present invention is to provide devices, systems and methods for rider controls for adjusting and displaying pressure and height settings for vehicle air suspension devices used in vehicles such as motorcycles.

A secondary objective of the present invention is to provide devices, systems and methods for rider controls for displaying air shock pressure and motorcycle seat height, with an assembly that is mountable to an existing control panel clamp on the handlebar of the motorcycle.

The third objective of the present invention is to provide devices, systems and methods for rider controls having a waterproof sealed housing for displaying air shock pressure and motorcycle seat height, on the handlebar of the motorcycle.

An air pressure and display assembly for use with air pressure shocks and struts on motorcycles, that can include a pressure adjustment and display assembly attached to an air shock on a rear wheel of a motorcycle, switches on the assembly for increasing and decreasing air pressure to the air shock, and a mount for attaching the assembly to a handlebar on the motorcycle.

The switches can include press button switches.

The assembly can include a main chassis, a rear cover, a water seal gasket between the main chassis and the rear cover, and fasteners for attaching the main chassis to the rear cover, wherein the gasket forms a waterproof seal between the main chassis and the rear cover.

Both the main chassis and the rear cover can include channels which face one another so that the gasket fits into the channels.

The air pressure and display assembly of claim 1, can include an eyelet having a through-hole protruding from a corner of the assembly, the eyelet for attaching a fastener there though so that the fastener attaches the assembly to an existing control panel on the motorcycle handlebar, wherein the existing control panel on the motorcycle includes a strap clamp which attaches the existing control panel to the motorcycle handlebar, and the fastener attaches the assembly to the strap clamp.

The air pressure and display assembly can include liquid crystal display (LCD) for displaying pressure in pounds per square inch (PSI).

The air pressure and display assembly can include a height display for displaying height of the motorcycle above ground level.

The height display can display the extension of the air shock in percentage (%).

A method of mounting an air pressure and display assembly on a motorcycle, can include the steps of providing an air pressure and display assembly which adjusts air pressure to an air shock on a motorcycle, removing a fastener from an existing clamp which attaches a control panel to a handlebar on the motorcycle, and mounting the air pressure and display assembly to the handlebar by attaching another fastener to the existing clamp on the handlebar of the motorcycle.

The providing step can include the step of providing an eyelet protruding from the air pressure and display assembly, and attaching the other fastener through the eyelet.

The providing step can include the step of providing the air pressure and display assembly with an LCD (liquid crystal display) which displays air pressure of the air shock.

The providing step can include the step of providing the air and pressure display assembly with a height display, which displays height of the motorcycle seat over ground level.

The providing step can include the step of providing the air pressure and display assembly with the height display with an LCD (liquid crystal display).

The providing step can include the step of providing the air and pressure display assembly with a two part housing having a water sealing gasket between the two part housing.

The method can further include the step of providing each of the two part housing with channels for supporting portions of the gasket therein.

Further objects and advantages of this invention will be apparent from the following detailed description of the presently preferred embodiments which are illustrated schematically in the accompanying drawings.

BRIEF DESCRIPTION OF THE FIGURES

FIG. 7 is a top view of the air pressure control and display assembly of FIG. 1.

FIG. 8 is a bottom view of the air pressure control and display assembly of FIG. 1.

FIG. 9 is a rear perspective exploded view of the air pressure control and display assembly of FIG. 1.

FIG. 16 is a front perspective view of a second embodiment dual display assembly that includes a pressure control and display LCD (liquid crystal display) along with a seat height display LCD.

FIG. 17 is a rear perspective view of dual control and display assembly shown in FIG. 16.

FIG. 18 is a front view of the dual control and display assembly of FIG. 16.

FIG. 19 is a rear view of the dual control and display assembly of FIG. 16.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

10 Pressure control and display assembly.
20 Main chassis, pressure display assembly.
30 Back cover.
40 Gasket seal.
50 Pressure LCD display.
55 Pressure LCD controller printed circuit board.
60 Up push button switch.
65 Down push button switch.
70 Overlay window.
80 Mounting eyelet.
90 Assembly screws.
95 Control cable egress in back cover.
100 Gasket channel in main chassis.
110 Gasket channel in back cover.
120 Motorcycle grip assembly with integrated control panel and handlebar clamp.
125 Existing integrated control panel.
130 Motorcycle grip.
135 Threaded hole in grip assembly for securing clamp strap.
140 Motorcycle handlebar.
150 Handlebar clamp screw is replaced by a longer screw to account for the thickness of the mounting eyelet.

160 Handlebar clamp strap.
170 Clamp strap screws.
180 Pressure gauge control cable.
190 Sample pressure gauge reading.
200 Dual display pressure and seat height gauge assembly.
210 Seat height LCD display shows percentage of air shock extension from 0% to 100%.
220 Sample height gauge reading.
230 Main chassis, dual display assembly.
240 Dual display control cable.
250 Display mounting screws.

Figure 1:
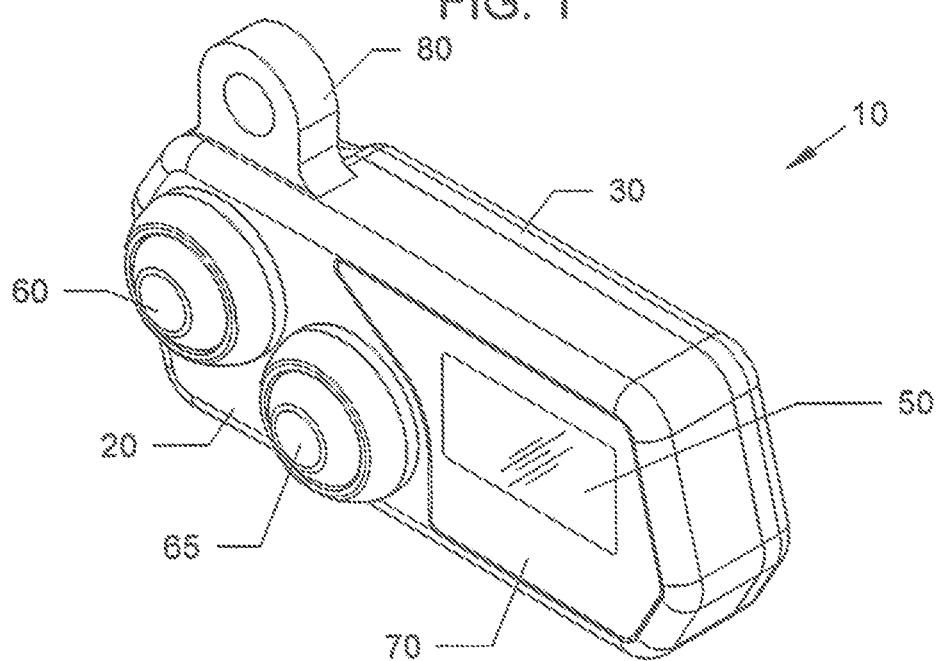
FIG. 1 is a front perspective view of a first embodiment of an air pressure control and display assembly for motorcycle riders.
Figure 2:
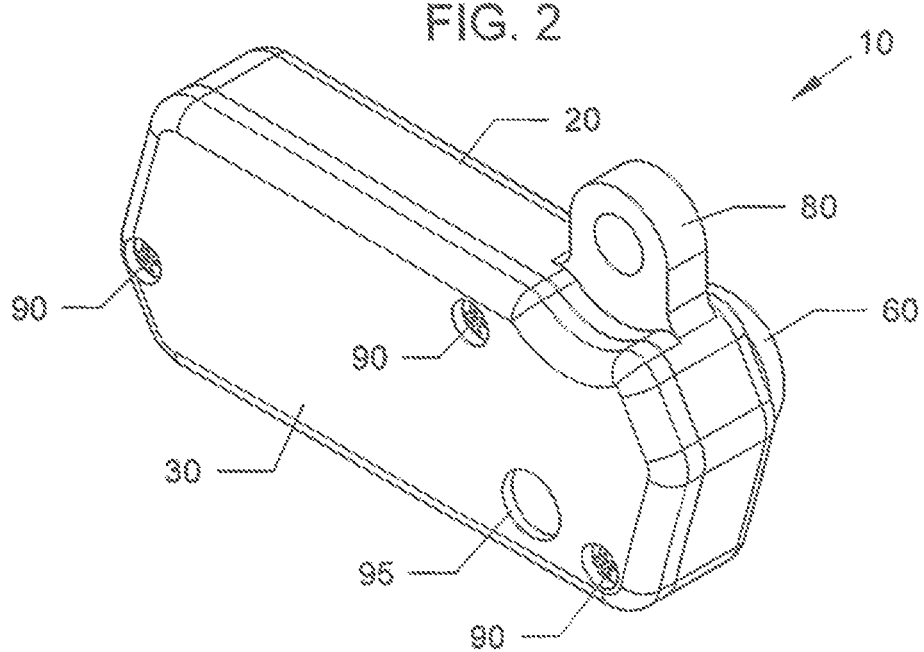
FIG. 2 is a rear perspective view of the air pressure control and display assembly of FIG. 1.
Figure 3:
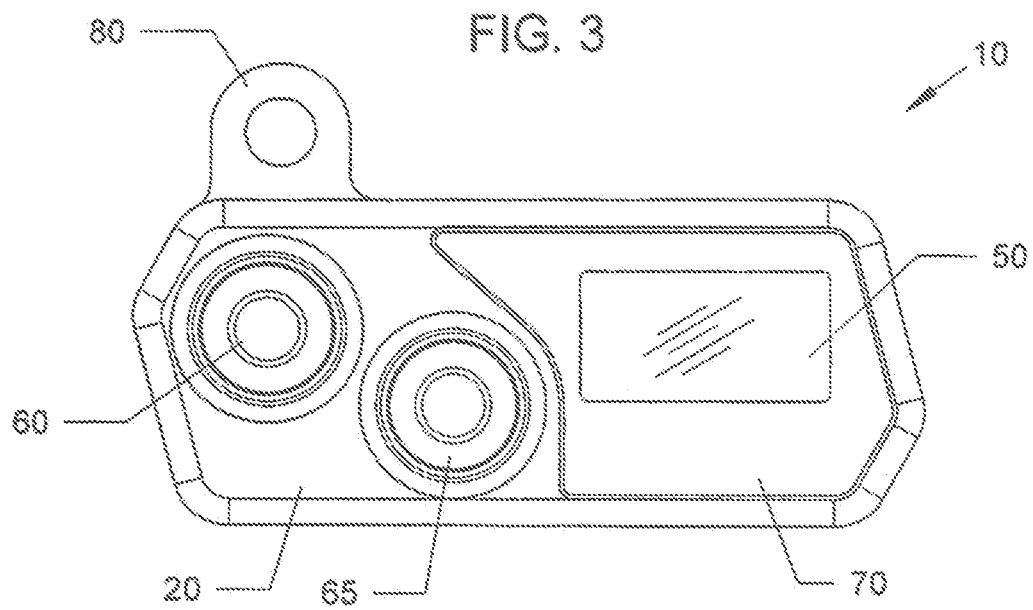
FIG. 3 is a front view of the air pressure control and display assembly of FIG. 1.
Figure 4:
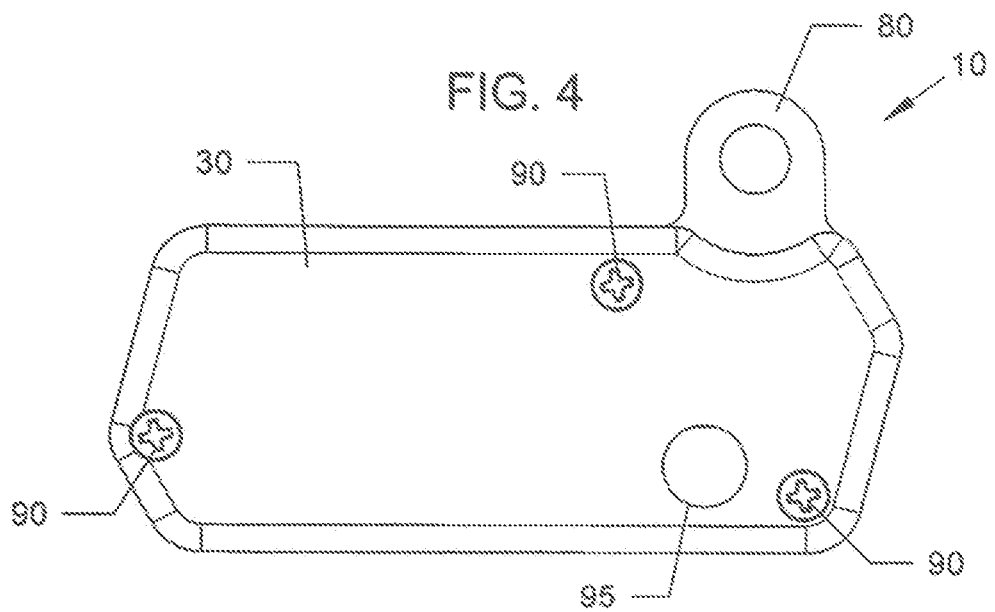
FIG. 4 is a rear view of the air pressure control and display assembly of FIG. 1.
Figure 5:
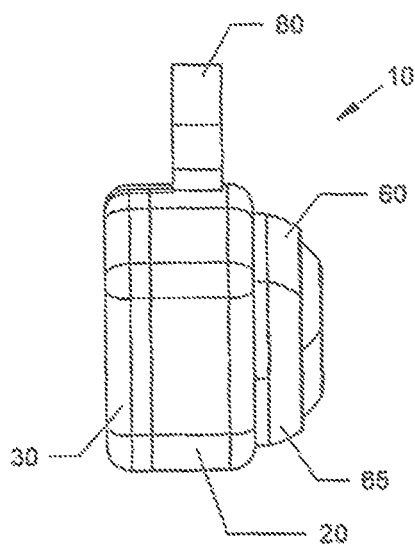
FIG. 5 is a left side view of the air pressure control and display assembly of FIG. 1.
Figure 6:
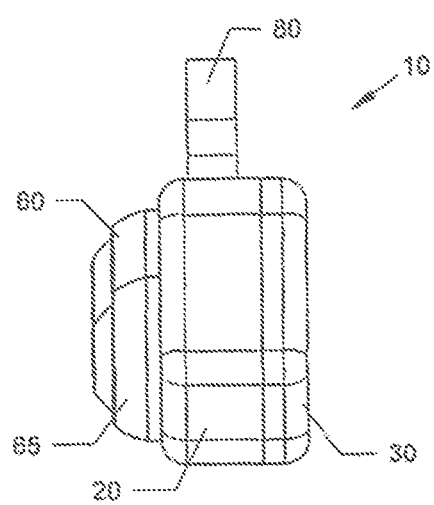
FIG. 6 is a right side view of the air pressure control and display assembly of FIG. 1.

FIG. 1 is a front perspective view of a first embodiment of an air pressure control and display assembly 10 for motorcycle riders, that can be used with adjustable air shock/air strut as shown and described in U.S. Pat. No. 8,113,322 to Arnott, which is incorporated by reference in its' entirety. FIG. 2 is a rear perspective view of the air pressure control and display assembly 10 of FIG. 1. FIG. 3 is a front view of the air pressure control and display assembly 10 of FIG. 1. FIG. 4 is a rear view of the air pressure control and display assembly 10 of FIG. 1. FIG. 5 is a left side view of the air pressure control and display assembly 10 of FIG. 1. FIG. 6 is a right side view of the air pressure control and display assembly 10 of FIG. 1. FIG. 7 is a top view of the air pressure control and display assembly 10 of FIG. 1. FIG. 8 is a bottom view of the air pressure control and display assembly 10 of FIG. 1.

FIG. 9 is a rear perspective exploded view of the air pressure control and display assembly 10 of FIG. 1.

Figure 10A:
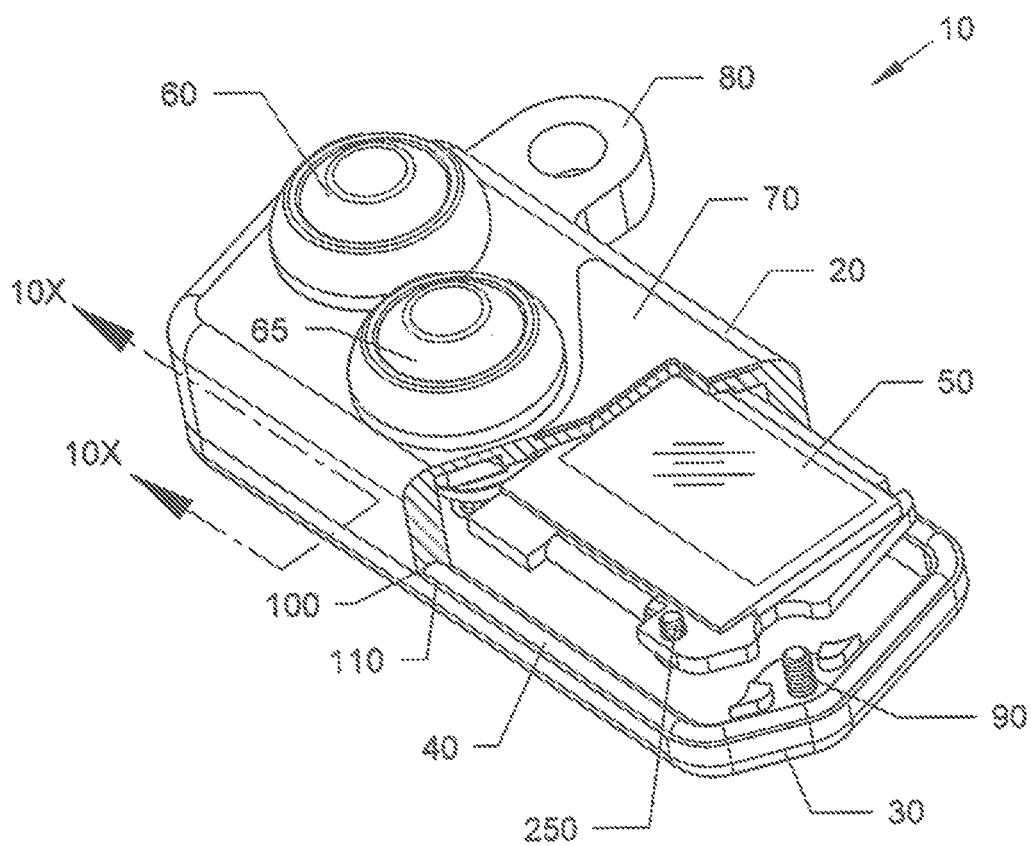
FIG. 10A is a front partially sectioned perspective view of the air pressure control and display assembly of FIG. 1 highlighting the gasket seal and the gasket channels in the main chassis and the back cover.
Figure 10B:
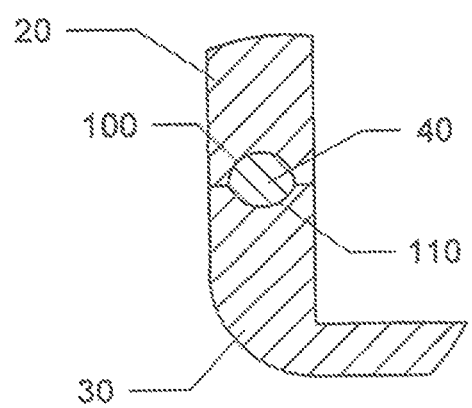
FIG. 10B is a partial cross-sectional view of the air pressure control and display assembly of FIG. 10A along arrows 10X.

FIG. 10A is a front partially sectioned perspective view of the air pressure control and display assembly 10 of FIG. 1 highlighting the gasket seal 40 and the gasket channels 100, 110 in the main chassis 20 and the back cover 30. FIG. 10B is a partial cross-sectional view of the air pressure control and display assembly of FIG. 10A along arrows 10X.

Referring to FIGS. 1-10B, air pressure control and display assembly 10 can include a main chassis 20, having a generally rectangular configuration formed and/or molded with an upwardly protruding mounting eyelet 80 having a through-hole. The chassis 20 and back cover 30 can be formed from metal, such as but not limited to aluminum, stainless steel, galvanized metal, and the like. Alternatively, chassis 20 and back cover 30 can be formed form molded plastic, and the like. An overlay window 70 can cover a 3 digit LCD (liquid crystal display) 50 which can display pressure readings from approximately 0 PSI to approximately 275 PSI to the user. The LCD 50 can be connected to a pressure LCD controller printed circuit board 55, with LCD 50 and circuit board 55 mounted inside of the chassis 20 by fasteners 250, such as but not limited to screws, and the like.

The LCD 50 can display current shock/strut pressure setting and allow the user to adjust the pressure to create a stiffer or more cushioned ride. Push button switch 60 can be depressed to increase pressure in the shock/strut and thereby make for a stiffer ride. Push button switch 65 can be depressed which will cause air to be released from the shock/strut thereby making for a more cushioned ride. Circuit board 55 can allow for recording a set pressure setting where the rider's last pressure setting is recorded and the last shock/strut pressure setting is maintained.

Additionally, the assembly 10 can allow for the regular rider to depress both buttons 60, 65 simultaneously to record a desired pressure setting, where the shock/strut is then moved to the pre-set setting. Whenever both buttons 60, 65 are depressed. Alternatively, another switch button can be provided to lock in a desired pressure setting or more than one pressure settings for stiffer and cushioned ride conditions.

Referring to FIGS. 1-10B, a one-piece gasket seal 40 (such as but not limited to an elastomer, rubber, silicon, and the like), can be placed partially within a gasket channel 100 in the perimeter of main channel 20, and have another portion partially placed within gasket channel 110 in the back cover 30. Fasteners 90, such as but not limited to screws, and the like, can attach back cover 30 to main chassis 20 and create a fluid tight seal to prevent water from entering into the assembly 10. A control cable egress 95 in the back cover 30 can provide a water seal for allowing a cable 180 (shown in FIG. 13) to pass into the assembly 10.

Figure 11:
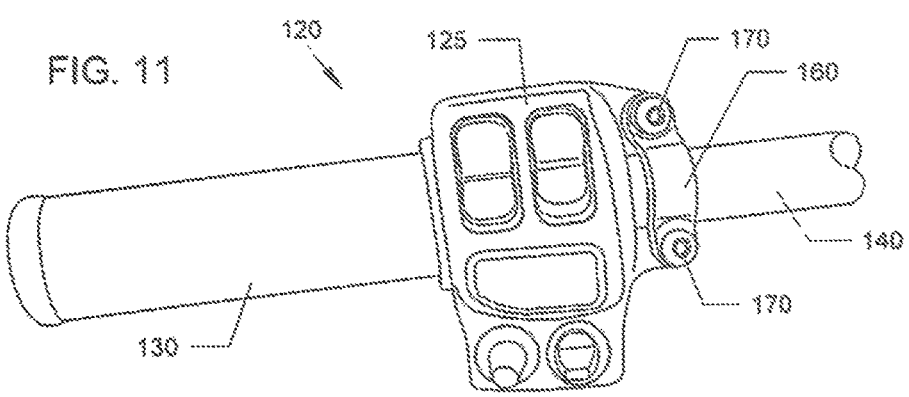
FIG. 11 is a top perspective view of an existing integrated control panel clamped adjacent to a grip on a motorcycle handlebar.
Figure 12:
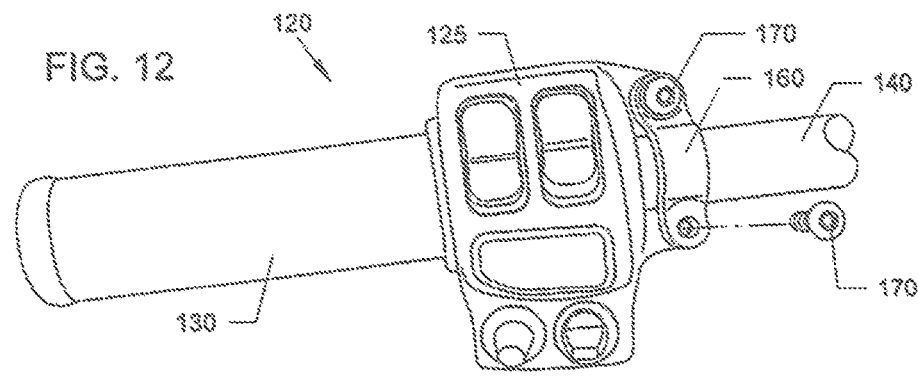
FIG. 12 shows the lower clamp strap screw being removed from the clamp shown in FIG. 11 in preparation for mounting the pressure control and display assembly.

FIG. 11 is a top perspective view 120 of an existing integrated control panel 125 clamped at 160, 170 to a motorcycle handlebar 140 adjacent to a grip 130. FIG. 12 shows the lower clamp strap screw 170 being removed from the clamp strap 160 shown in FIG. 11 in preparation for mounting the pressure control and display assembly 10.

Figure 13:
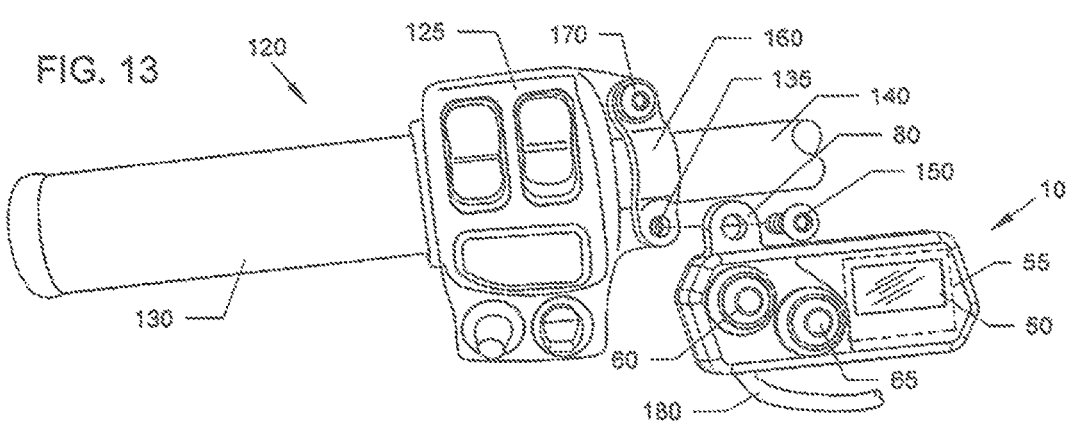
FIG. 13 shows the pressure control and display assembly of FIGS. 1-10 positioned for mounting on top of the existing clamp strap.

FIG. 13 shows the pressure control and display assembly of FIGS. 1-10 positioned for mounting on top of the existing clamp strap. The original screw 170 will be replaced with a longer screw 150 which attaches to threaded hole 135, which is to compensate for the thickness of the mounting eyelet 80 on the pressure control and display assembly 10.

Figure 14:
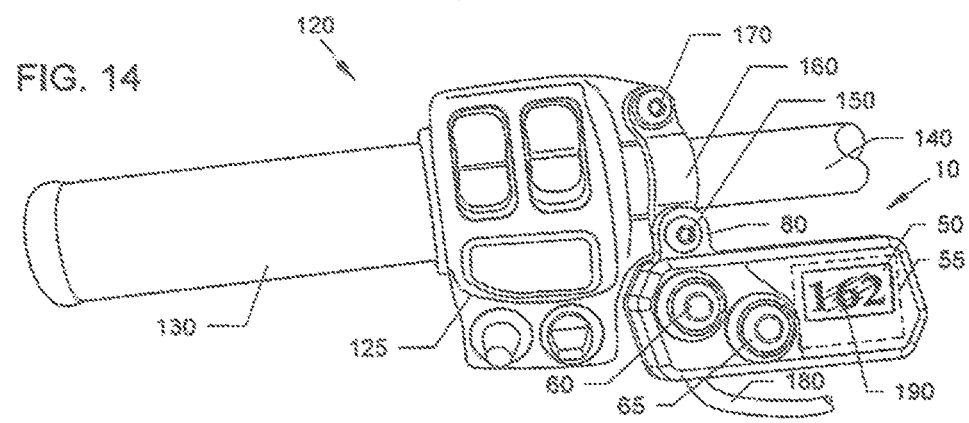
FIG. 14 is another view of FIG. 13 showing the pressure control and display assembly secured to the clamp strap.

FIG. 14 is another view of FIG. 13 showing the pressure control and display assembly 10 secured to the clamp strap 160. Cable 180 can be a pressure gauge control cable that connects to the adjustable air shock/air strut on the rear wheel of a motorcycle as shown and described in U.S. Pat. No. 8,113,322 to Arnott, which is incorporated by reference in its' entirety.

Figure 15:
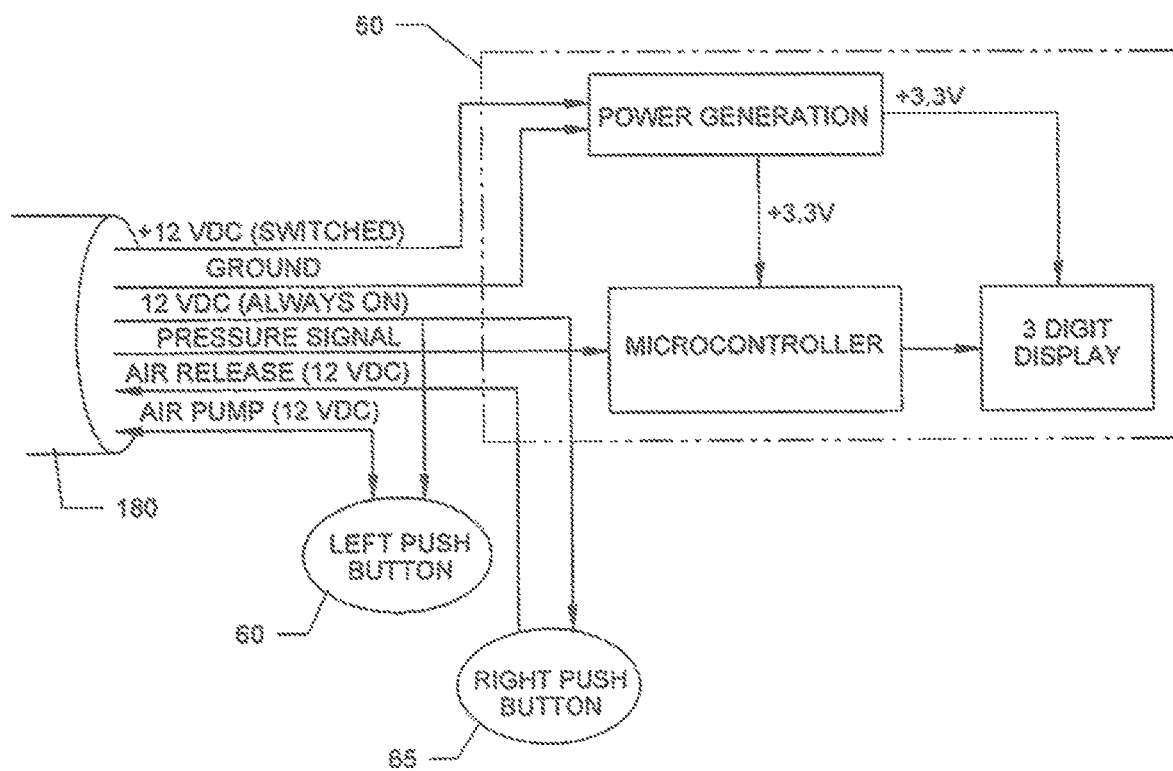
FIG. 15 is a system block diagram for the pressure control and display assembly shown in the preceding FIGURES.

FIG. 15 is a system block diagram for the pressure control and display assembly shown in the preceding FIGURES. Referring to FIG. 15, when the vehicle is turned on power goes to the microcontroller. A pressure transducer senses the pressure in the air suspension system and sends a signal to the microcontroller. The microcontroller converts this signal a unit of pressure and displays the pressure on the display screen 50. A three digit display 190 of the pressure amount can be displayed on the LCD screen 50.

Figure 20:
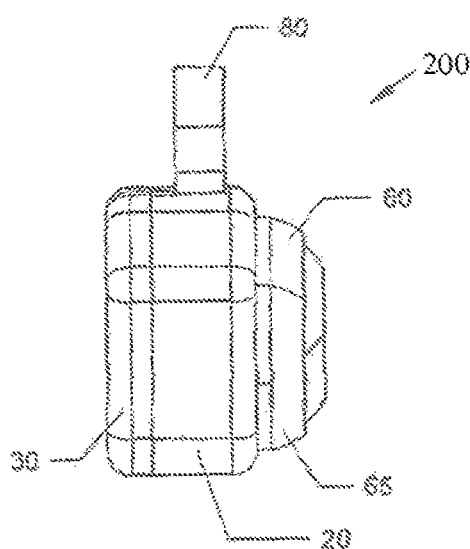
FIG. 20 is a left side view of the dual control and display assembly of FIG. 16.
Figure 21:
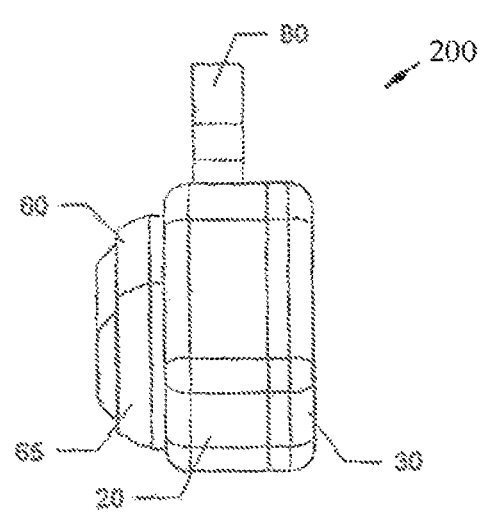
FIG. 21 is a right side view of the dual control and display assembly of FIG. 16.
Figure 22:
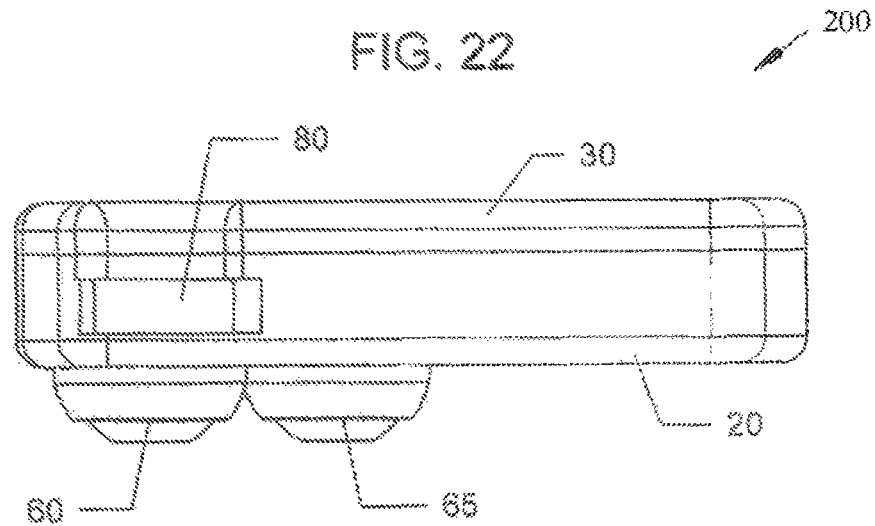
FIG. 22 is a top view of the dual control and display assembly of FIG. 16.
Figure 23:
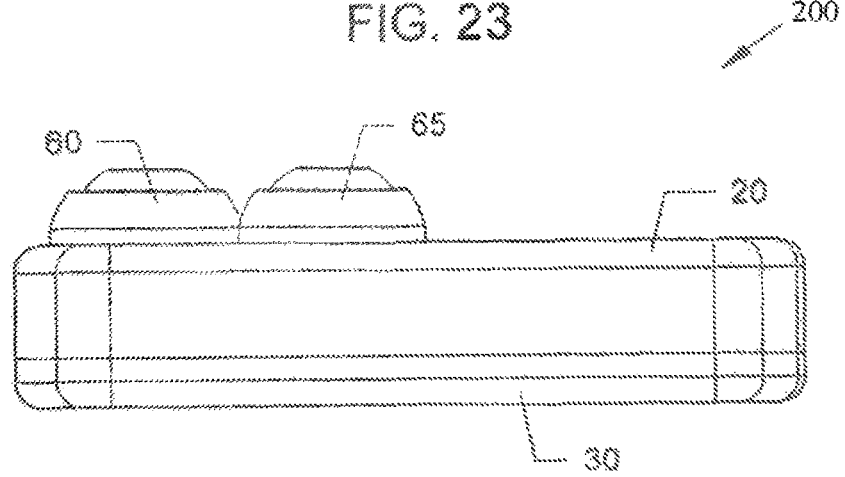
FIG. 23 is a bottom view of the dual control and display assembly of FIG. 16.

FIG. 16 is a front perspective view of a second embodiment dual display assembly that includes a pressure control and display LCD (liquid crystal display) 50 along with a seat height display LCD 210. FIG. 17 is a rear perspective view of dual control and display assembly 200 shown in FIG. 16. FIG. 18 is a front view of the dual control and display assembly 200 of FIG. 16. FIG. 19 is a rear view of the dual control and display assembly 200 of FIG. 16. FIG. 20 is a left side view of the dual control and display assembly 200 of FIG. 16. FIG. 21 is a right side view of the dual control and display assembly 200 of FIG. 16. FIG. 22 is a top view of the dual control and display assembly 200 of FIG. 16. FIG. 23 is a bottom view of the dual control and display assembly 200 of FIG. 16.

Figure 24:
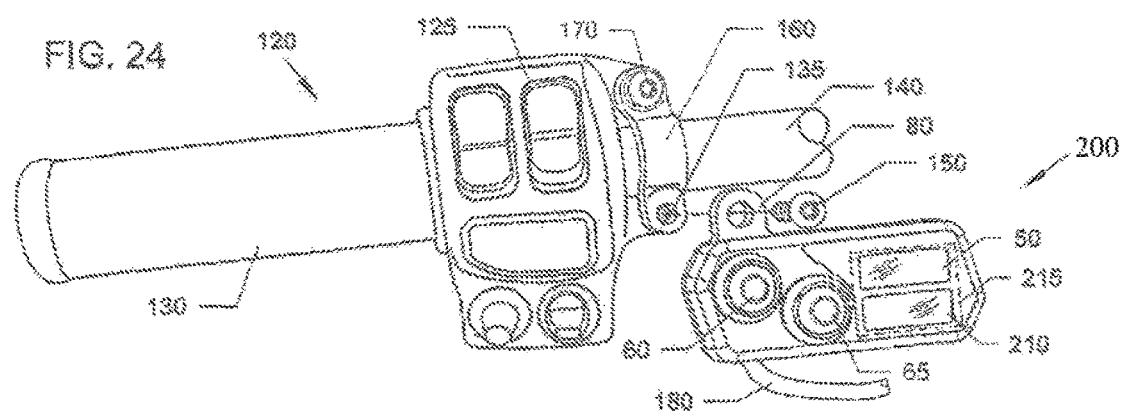
FIG. 24 is a top perspective view of an existing integrated control panel clamped adjacent to a grip on a motorcycle handlebar. The lower clamp screw has been removed and the dual control and display assembly is positioned to be secured to the top of the clamp strap using a new, longer, screw.
Figure 25:
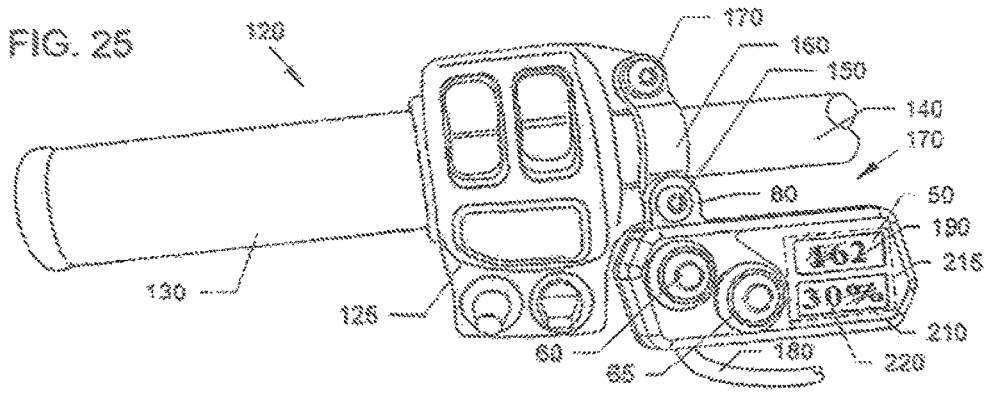
FIG. 25 is another view of the FIG. 24 showing the dual control and display assembly secured to the clamp strap.

FIG. 24 is a top perspective view of an existing integrated control panel 125 clamped adjacent to a grip 130 on a motorcycle handlebar 140. The lower clamp screw 150 has been removed from threaded hole 135 and the dual control and display assembly 200 is positioned to be secured to the top of the clamp strap 160 using a new, longer, screw 150. FIG. 25 is another view of the FIG. 24 showing the dual control and display assembly 200 secured to the clamp strap 160. In this embodiment the dual assembly 200 can include the pressure indication display 50 as well as a height display 210 which can display seat height reading 215. While a percentage sign is shown, the invention can display height in other units, such as but not limited to seat height of inches/feet over ground level, and the like.

Referring to FIGS. 16-25, the dual display 200 can function similar to the pressure and display assembly 10 in the previous embodiment, with the addition of a seat height setting for the rider.

Figure 26:
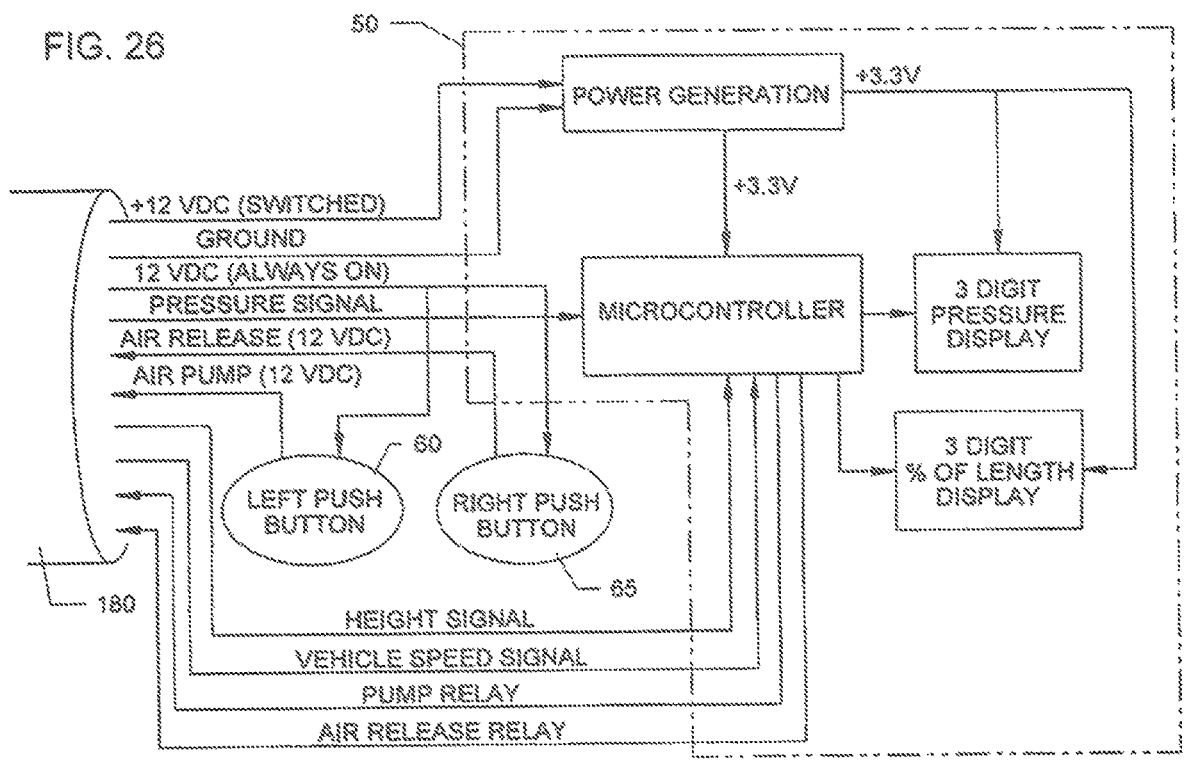
FIG. 26 shows a system block diagram for the dual control and display assembly shown in FIGS. 16-25.

FIG. 26 shows a system block diagram for the dual control and display assembly shown in FIGS. 16-25. The system block diagram operates similar to the previous system block diagram with additional features. A second signal is sent from a Linear Variable Differential Transformer (LVDT) that be attached to the air shock or another part of the suspension system of the vehicle. The microcontroller takes this signal and translates it to a percentage of the shock stroke being used. It this displays this number on the second screen.

The rider can adjust the seat height with depressible buttons 60, 65. Seat height LCD 210 can display percentage of air shock extension from 0% to 100%. When button 60 is depressed an air compressor pumps air into the suspension system and increases the pressure in the system. As pressure increases the air shock extends and increases the seat height of the vehicle. When button 65 is depressed and solenoid valve is opened. Air pressure is released from the system and the air shock decreases in length thus lowering the seat height of the vehicle.

Rider's can adjust seat height depending on their personal height. The rider can lower the bike when suspension travel in not needed but firm foot placement of the rider is. For example stopping at a traffic light or maneuvering the vehicle into a parking space. Once the vehicle starts moving again and the rider does not require a firm foot placement on the ground, the shock can be extended thus adsorbing bumps and imperfections on the riding surface.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of mounting an air pressure and display system on a motorcycle, comprising the steps of:
providing a water protected housing for an air pressure and display system which adjusts air pressure to an air shock on a wheel of a motorcycle;
providing the water protected housing with an eyelit;
removing a single existing fastener from an existing clamp which attaches an existing control panel to a handle bar on the motorcycle; and
mounting the housing for the air pressure and display system to the motorcycle by attaching another single fastener through the eyelit to the existing clamp on the handle bar on the motorcycle.

2. The method of claim 1, further comprising the step of:
displaying pressure readings from approximately 0 PSI to approximately 275 PSI.

3. The method of claim 1, wherein the providing step includes the step of:
providing the air pressure and display system with an LCD (liquid crystal display) which displays air pressure of the air shock.

4. The method of claim 1, wherein the providing step includes the step of:
providing the air and pressure display system with a height display, which displays height of the motorcycle seat over ground level.

5. The method of claim 4, wherein the providing step includes the step of:
providing the air pressure and display system with the height display with an LCD (liquid crystal display).

6. The method of claim 4, wherein the providing step further includes the step of:
displaying on the display a percentage of air shock extension from 0% to approximately 100%.

7. The method of claim 1, wherein the providing step includes the step of:
providing the housing with a top and a bottom; and
sealing the housing with a water sealing gasket positioned between the top and the bottom of the housing.

8. The method of claim 7, further comprising the step of:
providing the top and the bottom of the housing with channels for supporting portions of the gasket therein.

9. The method of claim 1, further comprising the steps of:
providing a display; and
displaying height extension of the motorcycle seat on the display over ground level; and
displaying air pressure in the air shock on the display.

10. The method of claim 9, further comprising the step of:
providing at least one button to control the displaying of the height extension of the motorcycle seat and the air pressure of the air shock.

11. The method of claim 10, further comprising the steps of:
providing a first push button to control displaying of the height extension of the motorcycle seat; and
providing a second push button to control displaying of the air pressure of the air shock.

12. A method of mounting an air pressure control to an existing clamp that attaches an existing control panel to a handle bar on a motorcycle having an air shock, the clamp having at least one existing fastener for attaching the existing control panel to the handle bar, comprising the steps of:
providing a housing for an air pressure control which adjusts air pressure to the air shock on the motorcycle;
providing the housing with an eyelit;
removing a single one of the at least one existing fastener from the clamp which attaches the existing control panel to the handle bar on the motorcycle; and
mounting the housing for the air pressure control to the motorcycle by attaching another single fastener through the eyelit to the existing clamp on the handle bar on the motorcycle.

13. A method for mounting a motorcycle air shock pressure control and display assembly to a motorcycle handle bar having a strap with an existing fastener for attaching a motorcycle control panel to the motorcycle handle bar, comprising the steps of:
providing a water protected housing having a display for displaying pressure in the motorcycle air shock;
providing a switch on the housing for increasing and decreasing air pressure levels to the motorcycle air shock; and
providing a single eyelet on the housing;
removing the existing fastener from the strap;

attaching the water protected housing to the handle bar with another fastener through the single eyelet and into the strap, so that both the motorcycle control panel and the motorcycle air shock pressure control and display assembly are both mounted to the motorcycle handle bar.

* * * * *